US012803645B2

(12) United States Patent
Pavlik

(10) Patent No.: US 12,803,645 B2
(45) Date of Patent: Nov. 17, 2026

(54) MULTI-FUNCTION ANTENNA SYSTEM FOR WIRELESS MICROPHONES AND IN-EAR MONITORS

(71) Applicant: Stephen Pavlik, Austin, TX (US)

(72) Inventor: Stephen Pavlik, Austin, TX (US)

( * ) Notice: Subject to any disclaimer, the term of this patent is extended or adjusted under 35 U.S.C. 154(b) by 150 days.

(21) Appl. No.: 18/895,834

(22) Filed: Sep. 25, 2024

(65) Prior Publication Data

US 2025/0105909 A1 Mar. 27, 2025

Related U.S. Application Data

(60) Provisional application No. 63/585,067, filed on Sep. 25, 2023.

(51) Int. Cl.
*H04B 7/10* (2017.01)
*H01Q 9/04* (2006.01)

(52) U.S. Cl.
CPC ............ *H04B 7/10* (2013.01); *H01Q 9/0428* (2013.01)

(58) Field of Classification Search
CPC ................................ H04B 7/10; H01Q 9/0428
See application file for complete search history.

*Primary Examiner* — Graham P Smith
(74) *Attorney, Agent, or Firm* — Patent 360; Barry Choobin

(57) ABSTRACT

An antenna system that can operated in three different modes i.e., spatial diversity mode, polarization diversity mode, and circular-polarization mode. The antenna system includes a vertical antenna and a horizontal antenna that can be interlocked orthogonally. The vertical antenna and the horizontal antenna can be used independently or in combination, and each have a BNC connector. Either of the vertical antenna and the horizontal antenna has a circular polarization adapter that allows using the antenna system in the CP mode.

12 Claims, 14 Drawing Sheets

MULTI-FUNCTION ANTENNA SYSTEM FOR WIRELESS MICROPHONES AND IN-EAR MONITORS

CROSS-REFERENCE TO RELATED APPLICATIONS

This application claims priority from a U.S. Provisional Patent Appl. No. 63/585,067, filed on Sep. 25, 2023, which is incorporated herein by reference in its entirety.

FIELD OF INVENTION

The present invention relates to a multi-function antenna system for wireless microphones and in-ear monitors, and more particularly, the present invention relates to an antenna system using printed log periodic dipole array (PLPDA) antennas.

BACKGROUND

The problems to be solved involve convenience, cost, and size of antenna deployment for wireless systems in the live entertainment and broadcast fields. This includes wireless microphones, wireless instrument systems, in-ear monitor systems, cue control systems, full-duplex communications systems, etc. In the live entertainment and broadcast fields, it is common to have at least two antenna inputs for every receiver so that the diversity reception scheme can be realized to help reduce dropouts due to fading. This requires two separate antennas separated by some distance known as spatial diversity. In the past decade having a single antenna deployment that includes two antenna elements oriented orthogonally in a polarization diversity configuration has become very popular. This is because it has become desirable to take up less space, not having to deploy two separate antennas to achieve spatial diversity. This is also popular as it reduces the time of setup having one antenna system do the work of two. This method of polarization diversity puts an antenna in two different planes, usually horizontal and vertical, rather than in two physically different locations separated by some space, like with spatial diversity. However, such specialized antenna systems have limited utility and are expensive.

On the other hand, in transmitters, circular polarization to transmit wireless signals for the live entertainment and broadcast fields has become quite popular. This is because many wireless systems in these fields, such as wireless microphones or in-ear monitor systems, change orientation often during use. Circular polarization helps reduce fading due to polarization mismatch of devices with signals of an unknown polarization. Even in situations where these devices are not changing orientation, circular polarization can help mitigate multipath interference, where a direct signal and a reflected signal arrive at the same time and can cause fading. This circular polarization has almost exclusively been achieved using axial mode helical antennas. The problem with axial mode helical antennas is the large size and high cost. To help with size, a collapsing axial mode helical antenna has been developed. In a typical collapsing axial mode helical antenna, the depth of the antenna is reduced by collapsing along the z-axis, however, the length and width of this antenna remain large. Moreover, the high cost limits the use of such antennas for small companies and technicians.

In the end, multiple specialized antennas need to be purchased to cover the needs of the different transmit and receive systems used in the live entertainment and broadcast fields today. A need is therefore appreciated for an antenna system that can overcome the aforementioned drawbacks and limitations with antennas.

A U.S. patent application No. 20190107617, assigned to Rf Venue Inc., discloses an antenna that solves the issue of quick deployment. The antenna takes up less space by utilizing polarization diversity with two orthogonally positioned antenna elements. However, one element is an LPDA, and the other is a dipole, which makes the system complex. Moreover, the dipole has efficiency issues as it is not a wideband antenna and can only be used for diversity reception. The reference discloses a wing-type structure that folds out to make the horizontal LPDA.

Another, U.S. Pat. No. 9,142,882, assigned to Rf Venue Inc., discloses a folding axial mode helical antenna. It solves the issue of condensing the size of a circularly polarized antenna with forward passive gain. However, the Z axis of this antenna can be reduced, the X and Y axis are still quite large. The high cost is a major limitation and is of limited use.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is directed to an antenna system that is compact and has wide-spread use avoiding the need for multiple antennas.

Another object of the present invention is that the antenna system can work with different devices used in entertainment and wireless broadcasting.

Yet another object of the present invention is that the antenna system is cost-effective.

Still, another object of the present invention is that the antenna system is simple to use.

A further object of the present invention is that the antenna system is for multi-purpose use, including circular polarization.

Still, a further object of the present invention is that the antenna system has a more consistent axial ratio.

An additional object of the present invention is that the antenna system can be assembled and disassembled into a smaller space.

In one aspect, the disclosed antenna system uses two printed log periodic dipole array (PLPDA) antennas that are inherently wide bandwidth in nature. When used in polarization diversity mode, the inputs of the disclosed antenna system are easily recognizable, preventing any margin of error.

In one aspect, horizontal and vertical antennas of the antenna system can be used independently.

In one aspect, the antenna system can be used for circular-polarized transmit/reception, spatial diversity, or polarization diversity reception.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
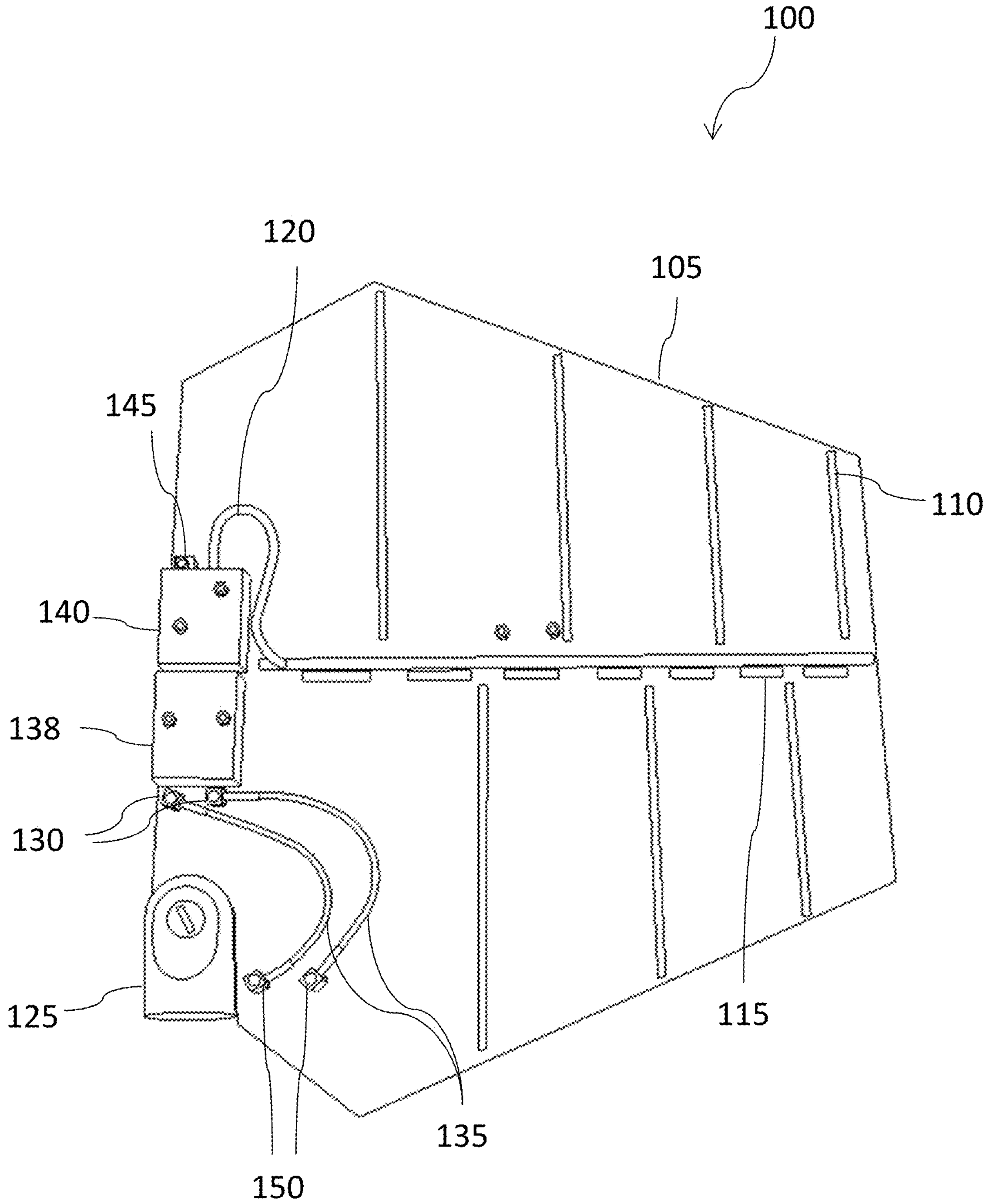
FIG. 1 shows a front view of a vertical antenna of an antenna system, according to an exemplary embodiment of the system.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

REFERENCE NUMERALS

100: Vertical Antenna
105: Base of the Vertical Antenna
110: Antenna elements of the Vertical Antenna
115: Slots in the Vertical Antenna
120: Feedline of the Vertical Antenna
125: Threading for microphone stand
130: MCX output Connector of a CP circuit
135: MCX cables
138: First Box to cover CP Circuit
140: Second Box to cover BNC circuit
145: MCX input connector for CP Mode
150: MCX connectors for storing MCX cables'
155: BNC Connector for CP Mode
160: BNC Connector for Stand-alone, Spatial, and Polarization Diversity Mode
165: Latch to secure Horizontal antenna for polarization diversity and CP Mode
170: Backside circuitry of BNC input and RG405
175: Circular Polarization Circuit (CP circuit)
180: 90 degree "Hybrid" coupler
185: Via Fence to isolate CP Circuit
190: 50-ohm Load
200: Horizontal Antenna
205: Elements of the Horizontal Antenna
210: Feedline for the Horizontal Antenna
215: Stand mounting
220: Box to cover BNC Connector
225: MCX input Connector for CP Mode
230: BNC Connector for Stand-alone, Spatial, and polarization Diversity Mode
235: Slot for interlocking with the latch of the Vertical antenna
300: Diversity Microphone Receiver
310: Microphone stand
320: Microphone stand
400: IEM Transmitter

DEFINITIONS

BNC Connector: It is a quick connect/disconnect coaxial connector, its structure and functioning of it is well known in the art.

MCX (Micro Coaxial connector): It is a coaxial connector with a snap-on interface, the structure and functioning of which is well known in the art.

Disclosed is a multifunctional antenna system that can achieve spatial diversity for receiver systems, polarization diversity for receiver systems, and circular polarization for transmit and receive systems. The disclosed system can work in three modes as per the requirement i.e., the spatial diversity mode, the polarization diversity mode, and the circular polarized in/out mode. This makes the invention versatile and cost-effective. Also, the installation of the system is easy and quick, depending on the intended use. Moreover, the disclosed system is compact for stowing in a very compact space.

Figure 5:
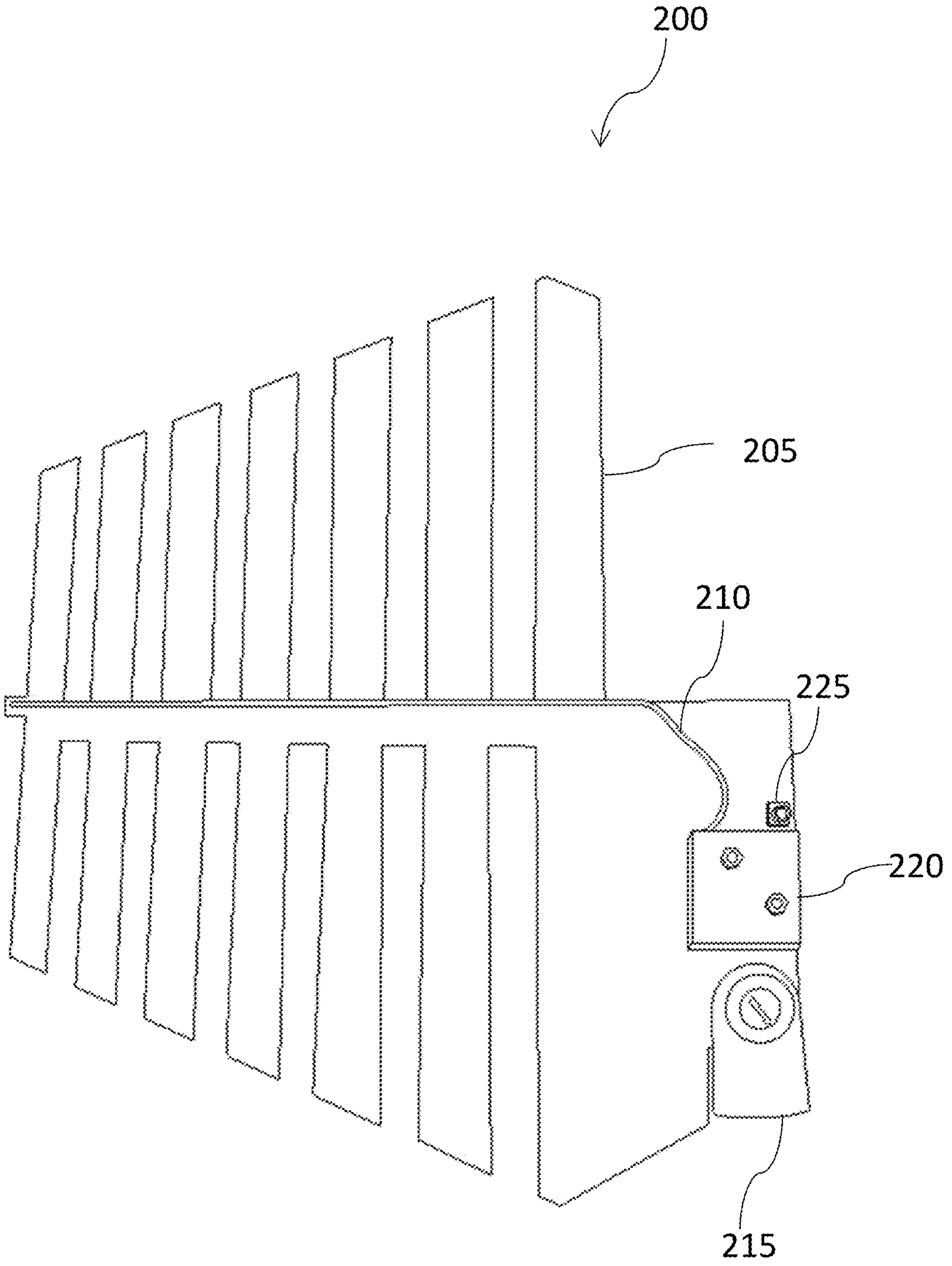
FIG. 5 shows a front view of a horizontal antenna of the antenna system, according to an exemplary embodiment of the system.

Disclosed antenna system 10 includes two Printed Log Periodic Dipole Array (PLPDA) antennas i.e., a vertical antenna as shown in FIG. 1, and a horizontal antenna as shown in FIG. 5. Depending upon the intended use, the two antennas can be used independently or in combination. The two antennas can operate independently in spatial or polarization diversity. Each of the two antennas includes a BNC connector as an input for their function so that the two antennas can operate independently in spatial or polarization diversity. The two antennas can be mounted on separate microphone stands and the position adjusted for desired Spatial diversity. For polarization diversity, the two antennas can be mounted on a single microphone stand and can be interlocked together orthogonally without any significant effect on the radiation pattern or impedance match of the two antennas.

In addition to the BNC connectors on each antenna, each of the two antennas also has an MCX Input Connector. One of the two antennas can include a circular polarization adapter (CP adapter) that consists of a 90-degree hybrid coupler with a single BNC input and two MCX outputs. When the horizontal and vertical antennas are interlocked, a transmitter such as an in-ear monitor transmitter can be plugged into the BNC connector of the CP adapter. Thereafter, two MCX cables, from the two MCX output connectors of the CP adapter, are plugged into the MCX Input Connectors of the horizontal and vertical antennas, resulting in a circular-polarized antenna that has a more consistent axial ratio than most axial mode helical antennas with forward passive gain known commercially designed for wireless systems in the live entertainment and broadcast fields.

The result is an antenna system consisting of two specialized PLPDA-type antennas that can satisfy the needs of all the previously specialized antenna systems needed for the receive and transmit systems in live entertainment and broadcast fields. This reduces the need to have multiple specialized antenna systems by a company or technicians. The disclosed system being compact also reduces the transport cost and requires less storage space. Also, the system, when used in circular-polarized mode, is smaller than any known circular-polarized antenna system with forward passive gain. Moreover, the better axial ratio makes it more circular.

The system may also provide for the storage of two MCX cables on the respective antenna itself with the CP adapter. This prevents losing the small and thin MCX cables. The drawing shows the vertical antenna having two MCX connectors for storing the MCX cables. The terms “MCX cable” and “MCX jumper” are interchangeably used herein. Also, the disclosure describes the system as having specific connectors, such as the BNC connector and MCX connectors, however, it should be obvious to those reading this disclosure that different connectors can be used, if so desired, and any suitable connector is within the scope of the present invention.

The disclosed antenna system is versatile in that having the functionality of three different antenna types. The system provides cross cross-polarized PCB antenna with forward gain without heavy modification to the feed system, detriment to radiation pattern, or impedance match. The two antennas can operate on their own or as part of the system in one of the three modes of operation. Most elements to make the antenna operate in CP mode can be attached to the antenna to prevent any pieces from getting lost in the field. The system provides a circular-polarized antenna with forward passive gain that can be folded into a form smaller than anything available for wireless microphone-type systems used in the live entertainment/broadcast fields.

In certain implementations, the impedance match can be controlled easily by controlling the length of the RG405 coaxial feed line that connects to the back of the antenna at the BNC connector and then feeds the antenna at the front at the feed point. LPDAs have to be fed at the front. Increasing the length of the RG405 feedline changes the phase at the antenna’s feed point. This changes the reactance portion of the complex impedance seen at the antenna’s feed point and can be carefully tuned by changing the length to create a 50-ohm match across the antenna’s tuning bandwidth. Or at least a match reasonably close to 50 ohms across the antenna’s tuning bandwidth.

However, these lengths also have to consider the phase relationship between the two antennas. The way to make Circular polarization from two cross-polarized antennas such as in this case is to have a 90-degree phase shift to one of the antennas. However, if both antennas have different lengths of RG405 feeding the feed point of the LPDA. The 90-degree phase shift can be offset by a delay in the arrival time caused by the different lengths of the RG405 feedline. For instance, one antenna may see 10 degrees of phase shift and the antenna with the 90-degree phase shift may actually see 110 degrees of phase shift. This can be corrected by adding more RG405 as the phasing line to make sure the antennas see a phase relationship of 90 degrees.

Referring to FIG. 1 which shows the vertical antenna 100 of the antenna system. The vertical antenna 100 includes a base 105 and antenna elements 110. In the middle along a longitudinal axis of the base 105 are shown elongated slots 115 spaced apart from each other. These elongated slots can be used to mount a horizontal antenna 200 (shown in FIG. 5). An RG405 Feedline 120 connects BNC and MCX input, in parallel to the Antenna feed point. A stand mounting 125 which can be a ⅝-27 threading for a Standard US Microphone stand is used to mount the vertical antenna 100 to any microphone stand, or any similar stand. Two MCX output connectors 130 of the CP adaptor are also shown in FIG. 1 and two MCX cables 135 extend from these two MCX output connectors to MCX storage connectors 150. When circular polarization is not intended, the two MCX cables 135 can be stored as shown in FIG. 1.

FIG. 1 further shows the first box 138 to cover the CP Circuit. A second box 140 that is adjacent to the first box 138 can cover the BNC Connector circuitry. The first box and the second box have a space in between them to hold the horizontal antenna in place when the horizontal antenna is mounted to the vertical antenna. Another MCX input connector 145 can be for connecting the MCX cable from the MCX output connector of the CP adapter.

Figure 2:
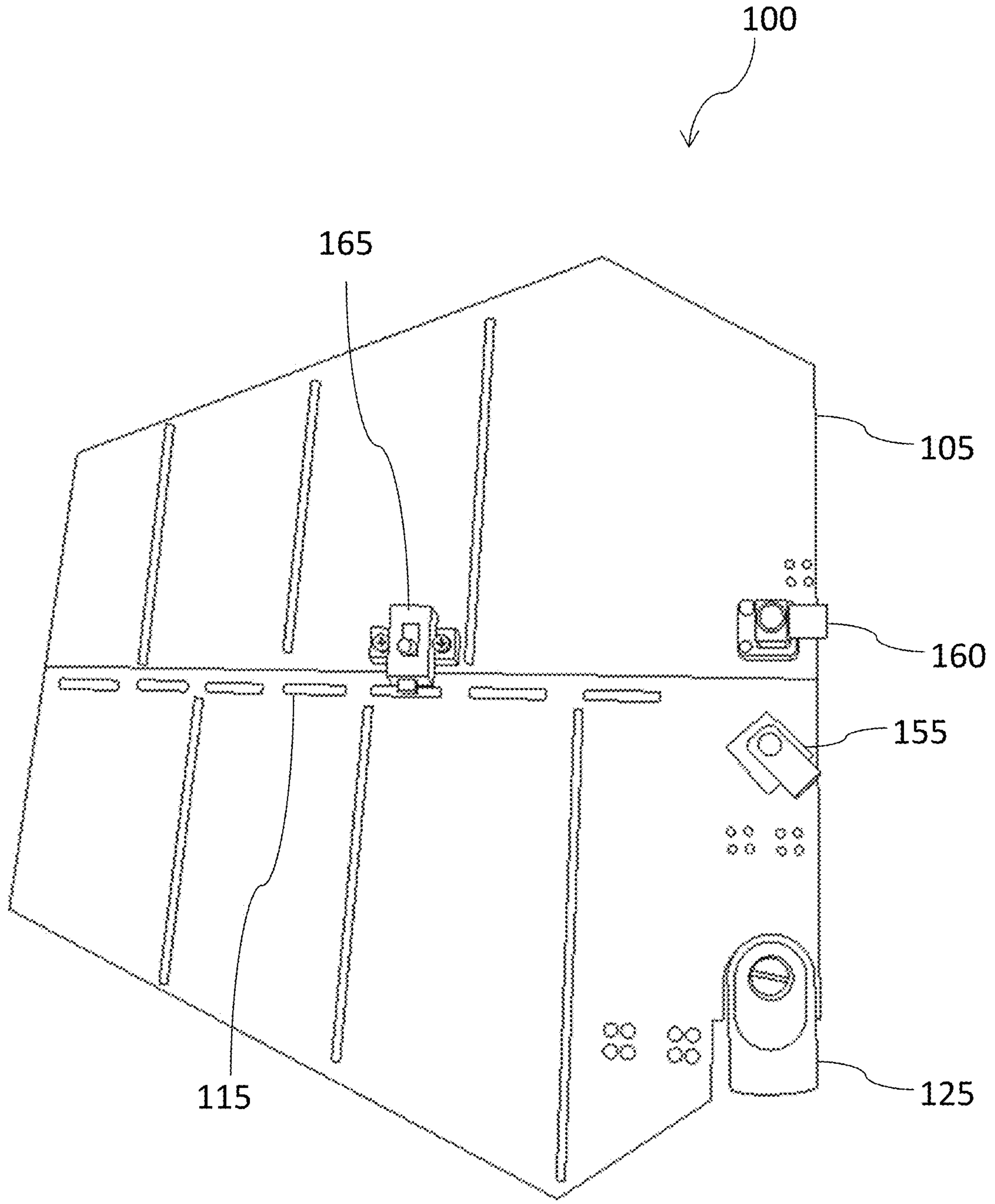
FIG. 2 shows a rear view of the vertical antenna, according to an exemplary embodiment of the system.

FIG. 2 shows a rear view of the vertical antenna 100, showing the BNC connector 155 of the CP adapter and a second BNC connector 160 for the stand-alone use, Spatial Diversity Mode, and polarization Diversity Mode. A latch 165 can secure the horizontal antenna to the vertical antenna.

Figure 3:
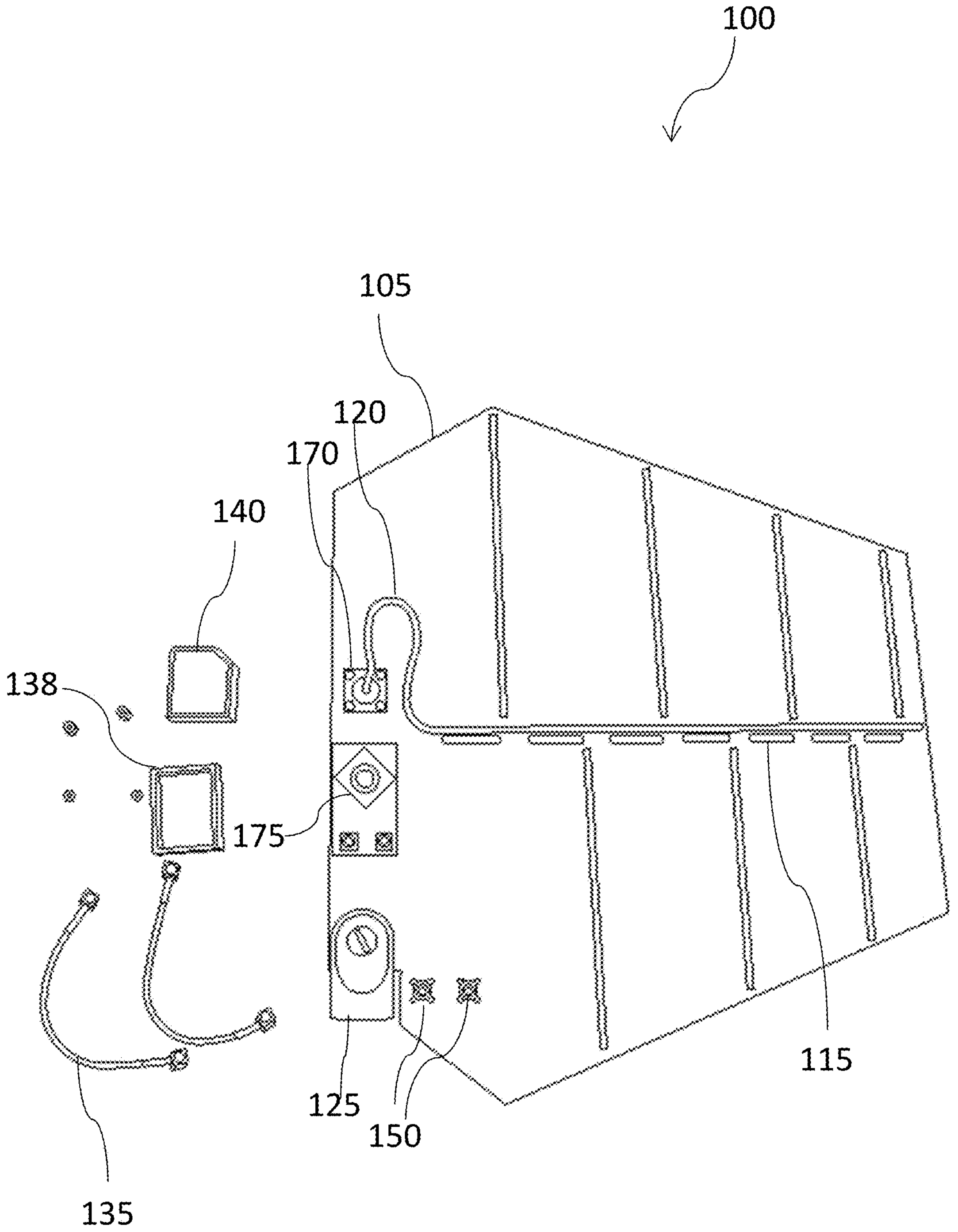
FIG. 3 shows an exploded view of the vertical antenna, according to an exemplary embodiment of the system.
Figure 4:
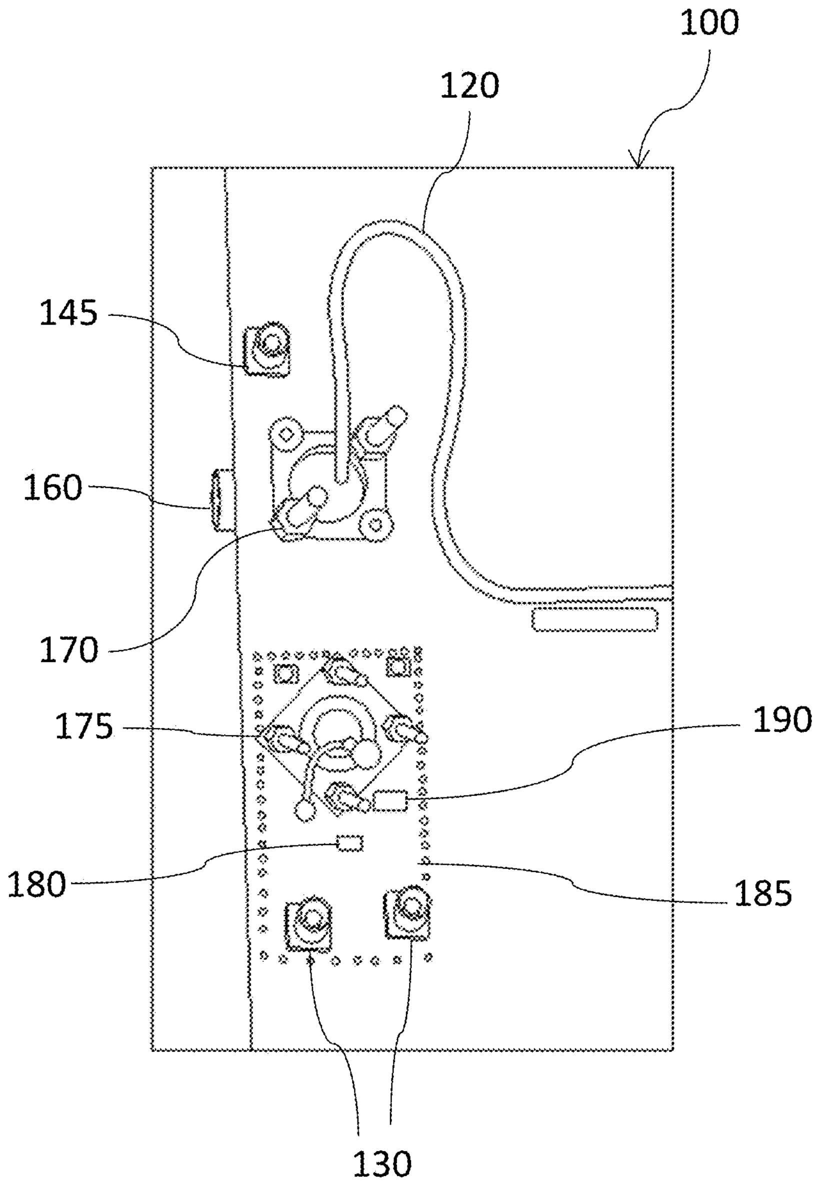
FIG. 4 shows an enlarged view of the front portion of the vertical antenna, according to an exemplary embodiment of the system.

FIG. 3 shows an exploded view of the vertical antenna 100 in which the boxes are removed to show the Circular Polarization Circuit (CP circuit) 175. Circuitry 170 is of the BNC input of the BNC connector 160, further shows the RG405 feedline extends from the circuitry, and secondary wire to parallel MCX connector. The boxes can be filled with low-density foam to help with waterproofing. FIG. 4 shows an enlarged view of the CP circuit 175 and the circuitry 170. In an enlarged view, the 90-degree "Hybrid" coupler 180 of the CP adapter is shown. Via Fence 185 is for isolating the CP circuit from the rest of the antenna and the 50-ohm Load 190 is for the 90-degree "hybrid" coupler.

FIG. 5 shows the horizontal antenna 200 that can be used independently of or with the vertical antenna. The horizontal antenna 200 can include antenna elements 205 that are in the form of elongated plates spaced apart from each other, wherein the arrangement of the antenna elements 205 corresponds to the slots 115 in the vertical antenna 100. An RG405 Feedline 210 can connect the BNC and MCX input in parallel to the Antenna feed point. Stand mounting 215 can be used to mount the horizontal antenna 200 to any stand, such as a microphone stand. A box cover 220 is to cover the BNC Connector and hold the phasing line in place. MCX input connector 225 is for connecting the MCX cable extending from the MCX output connector of the CP circuit and provides for using the antenna system in the CP mode.

Figure 6:
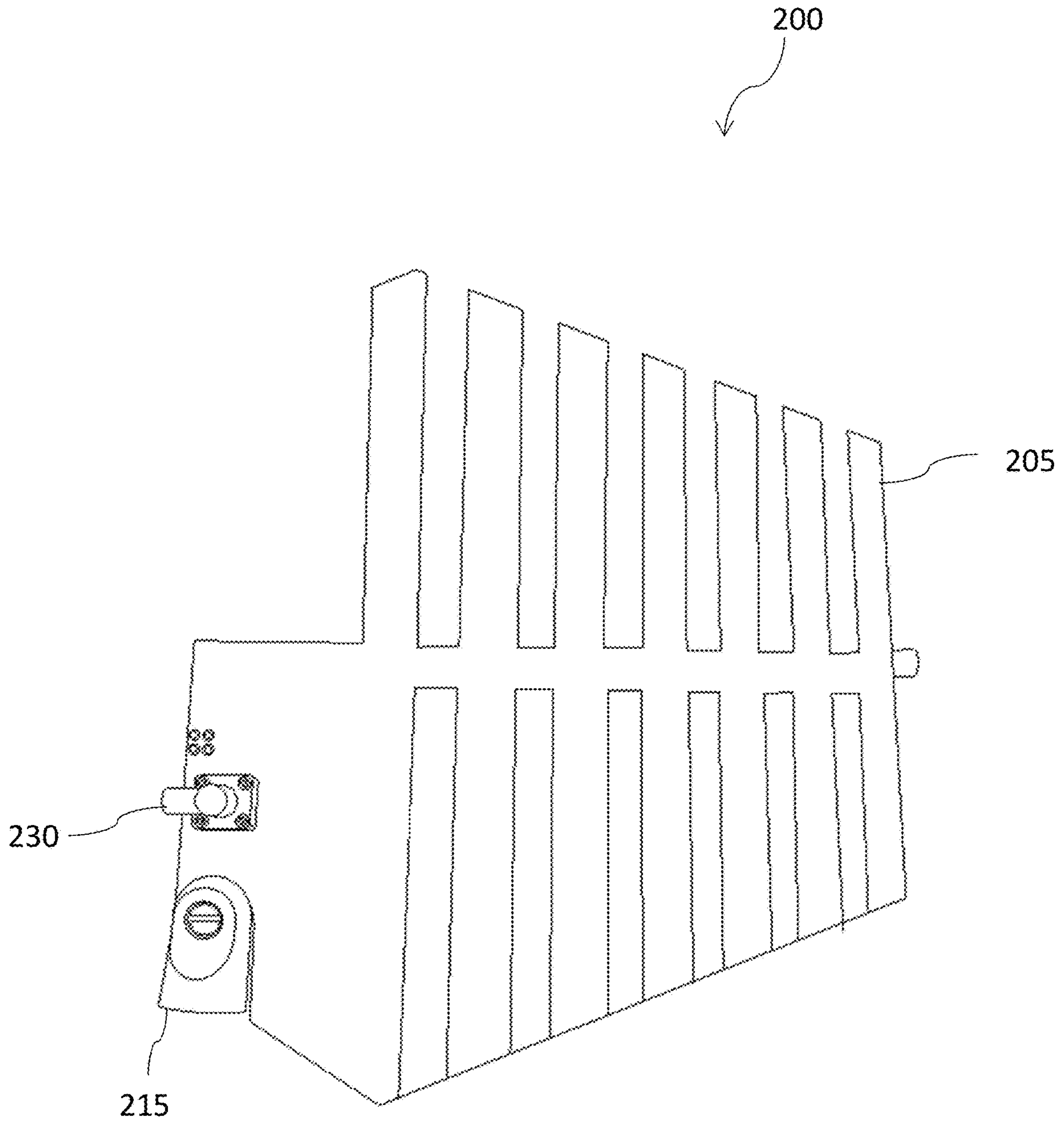
FIG. 6 shows a rear view of the horizontal antenna, according to an exemplary embodiment of the system.
Figure 7:
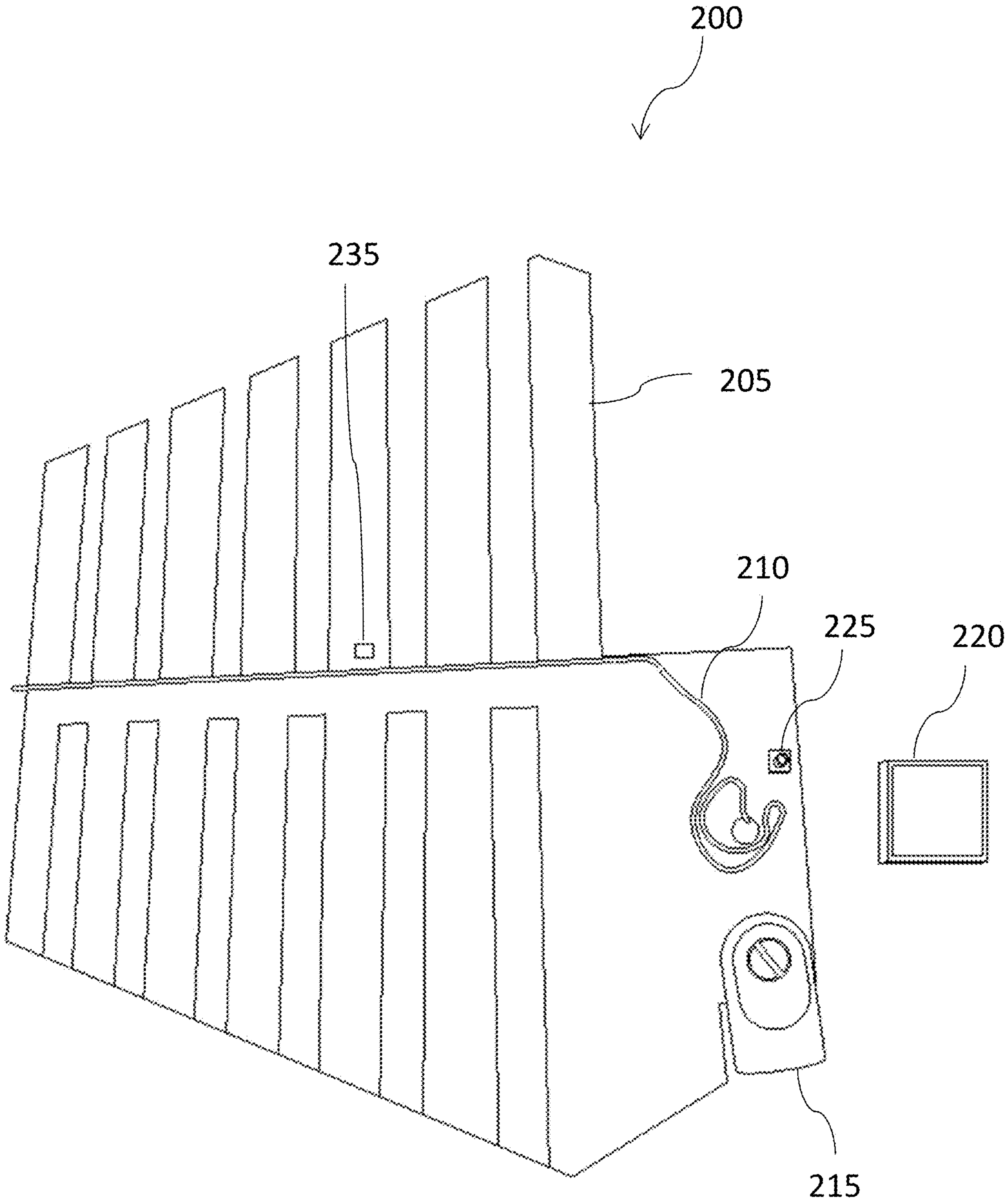
FIG. 7 shows an exploded view of the horizontal antenna, according to an exemplary embodiment of the system.
Figure 8:
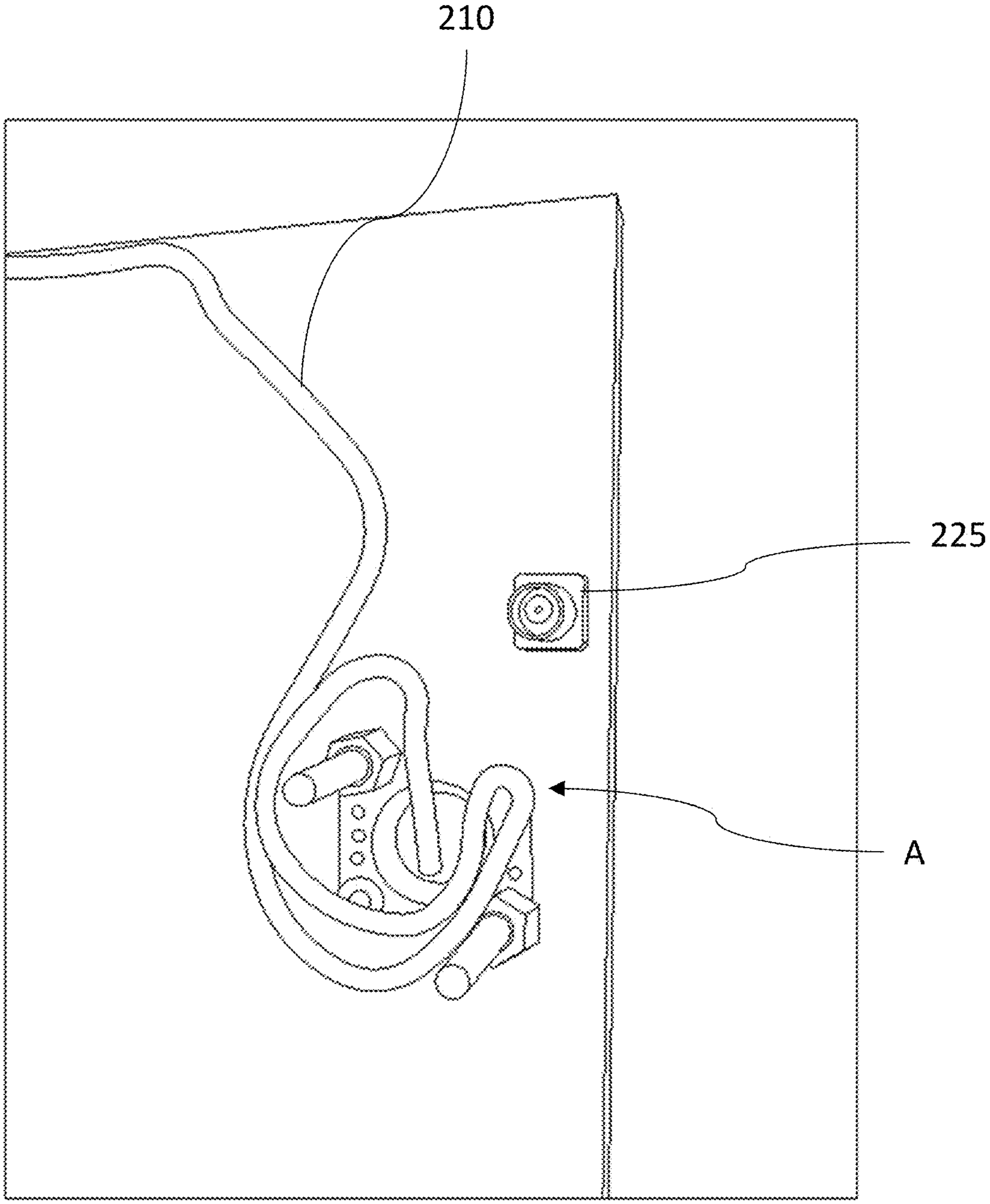
FIG. 8 shows an enlarged view of the front portion of the horizontal antenna, according to an exemplary embodiment of the system.

FIG. 6 shows the rear side of the horizontal antenna 200. The horizontal antenna also includes a BNC connector 230 for stand-alone use, Spatial Diversity Mode, and Polarization Diversity Mode. FIG. 7 shows the front side of the horizontal antenna in which box cover 220 is removed to show the back side of the BNC input, feedline, and the secondary wire to parallel MCX connector. FIG. 8 shows an enlarged view of the back side of the BNC input. Shown by arrow A, there is room for an extra RG405 to use as a "phasing line" to maintain the 90-degree difference between antennas. Additionally, Silicone Conformal coating can be applied for waterproofing.

Figure 9:
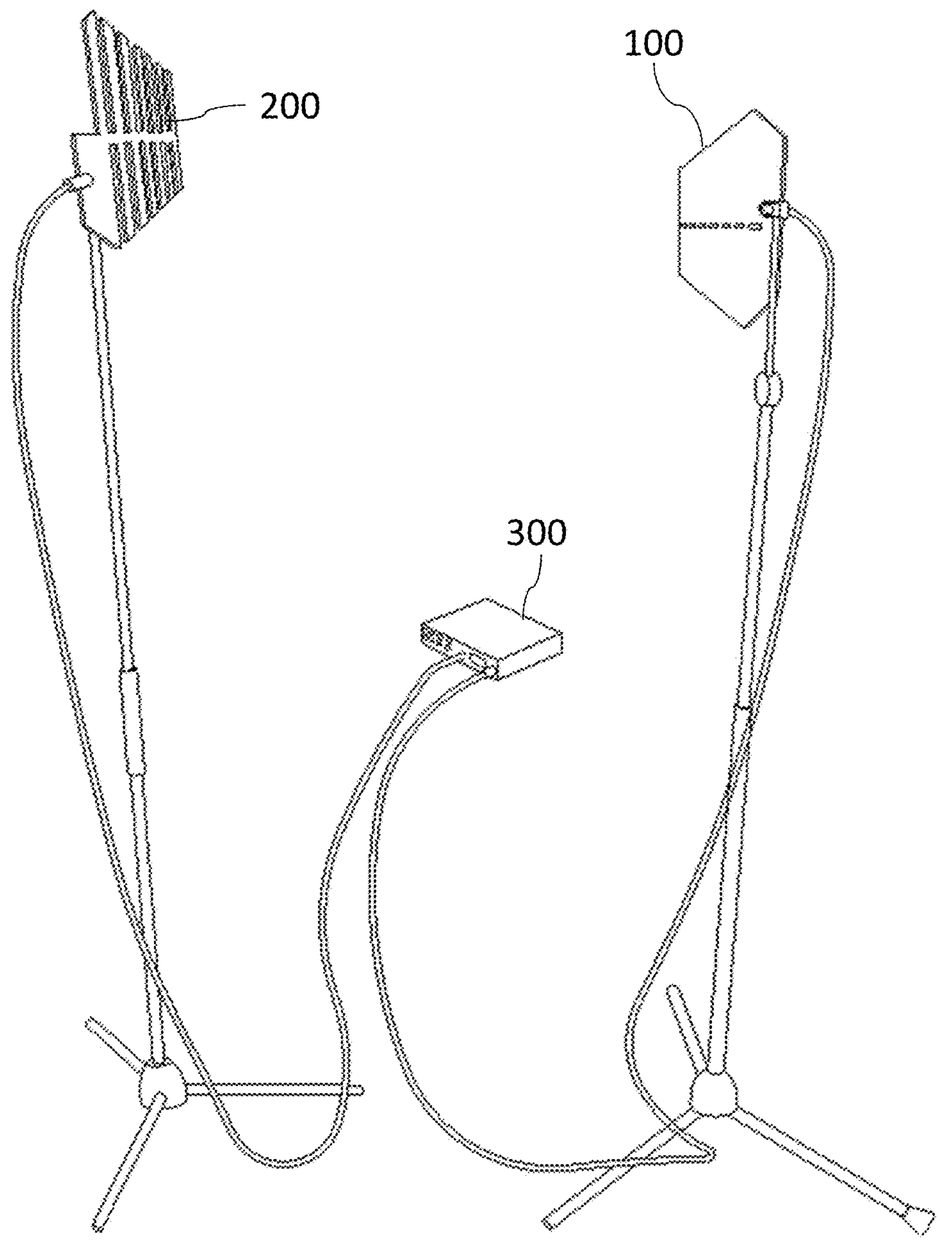
FIG. 9 shows the antenna system in a Spatial Diversity Mode, according to an exemplary embodiment of the system.

FIG. 9 shows the antenna system 10 in the Spatial Diversity Mode. The two antennas are separated by a predetermined distance and located in separate physical spaces. Each antenna is connected to one input of a diversity microphone receiver.

Figure 10:
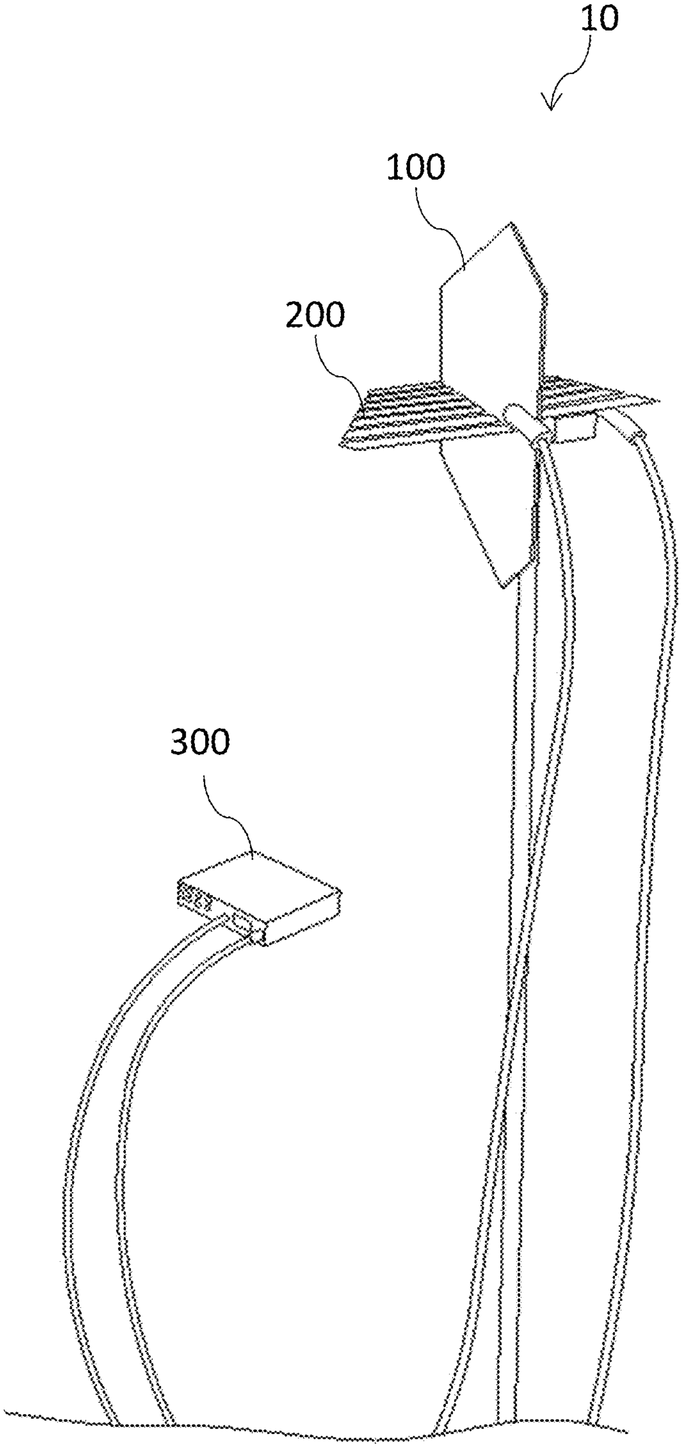
FIG. 10 shows the antenna system in a Polarization Diversity Mode, according to an exemplary embodiment of the system Polarization Diversity Mode

FIG. 10 shows the antenna system 10 in the Polarization Diversity Mode. The two antennas are orthogonally interlocked and mounted on one stand. The diversity is achieved via receiving signals in two different planes rather than in two different physical places (spatial diversity). The two antennas are connected to the two inputs of a diversity microphone receiver, respectively.

Figure 11:
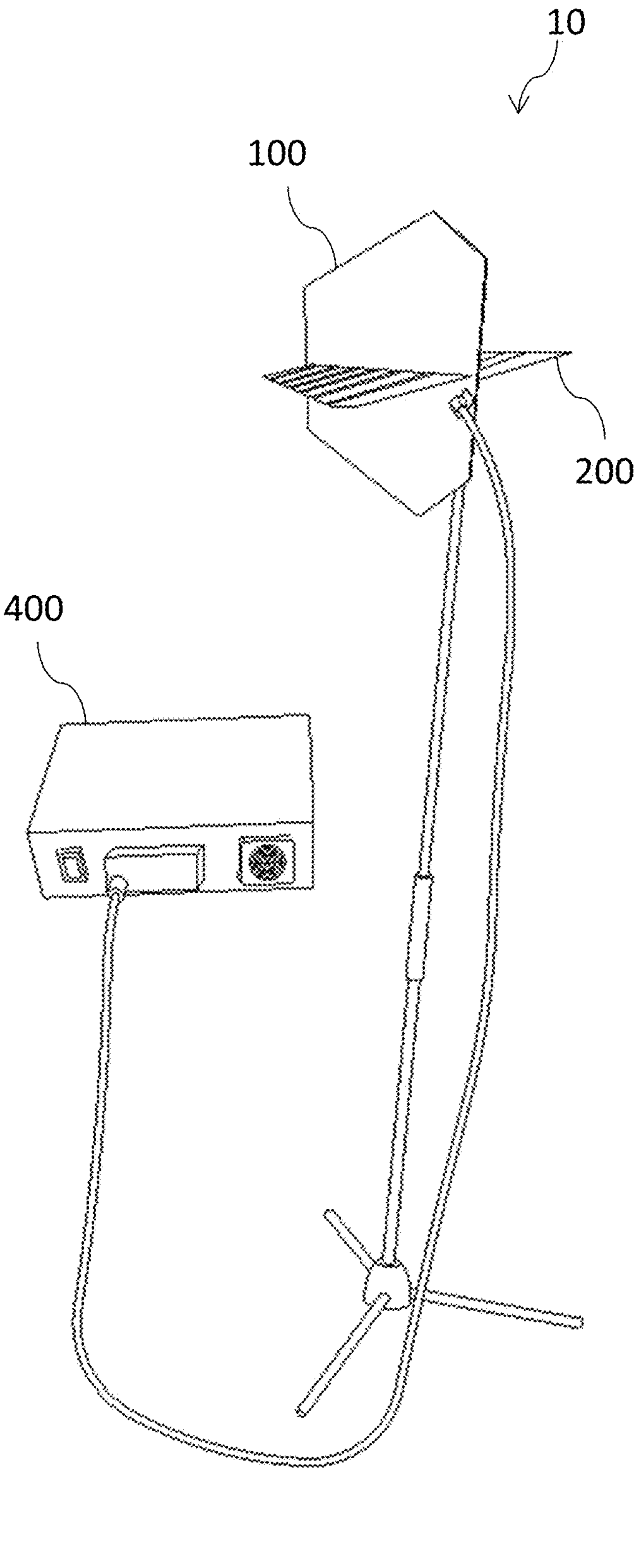
FIG. 11 shows the antenna system in a Circular Polarization Mode, according to an exemplary embodiment of the system.
Figure 12:
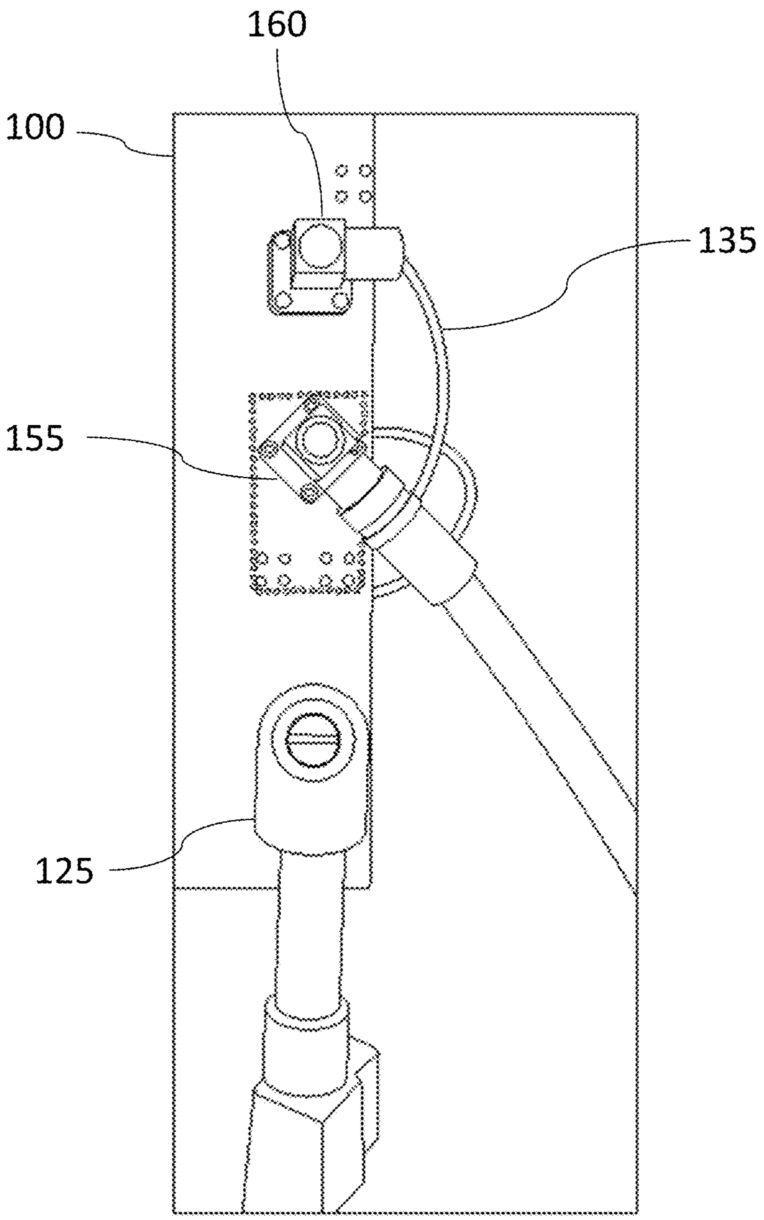
FIG. 12 shows an enlarged portion of the antenna system as in FIG. 11 further showing the BNC input for Circular Polarization mode, according to an exemplary embodiment of the system.
Figure 13:
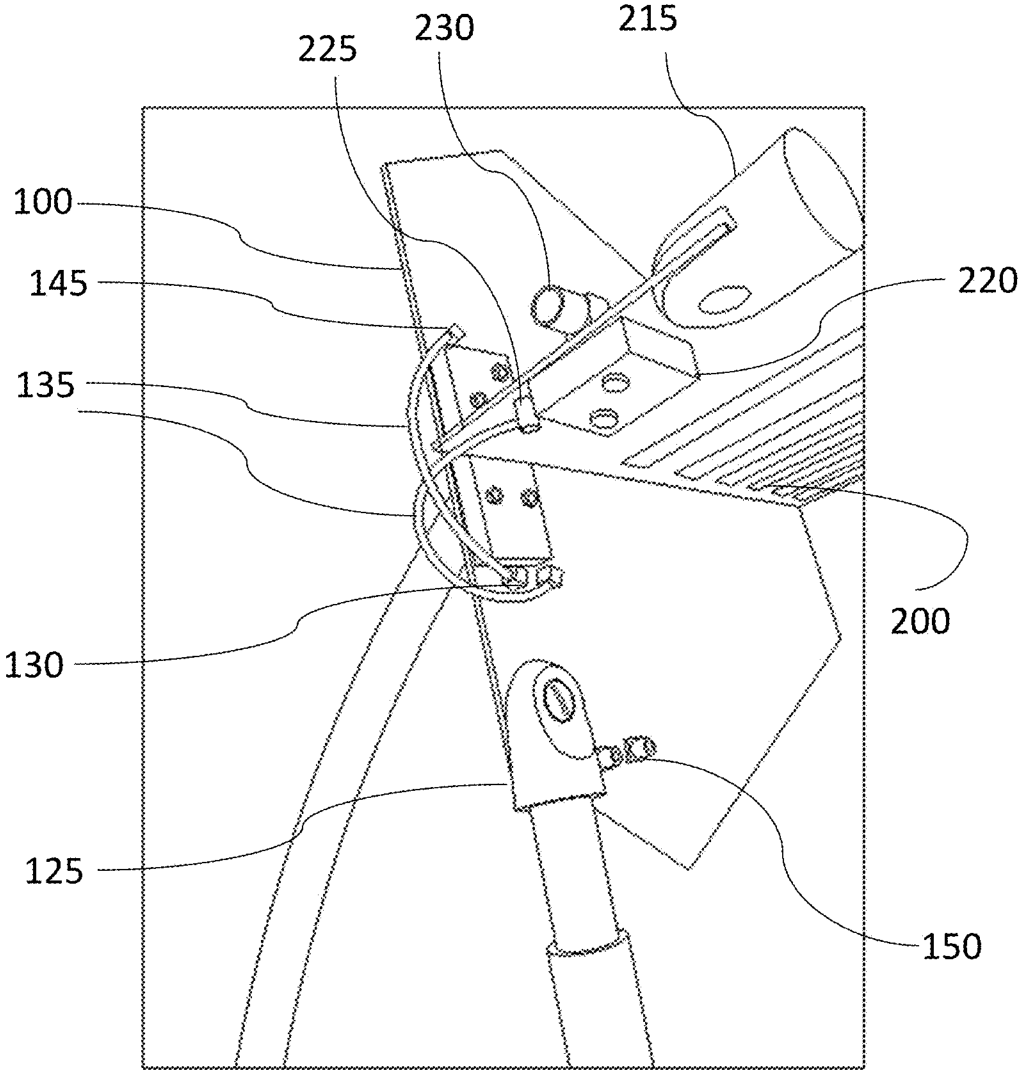
FIG. 13 shows connections in the Circular Polarization Mode, further showing Jumpers, according to an exemplary embodiment of the system.

FIG. 11 shows antenna system 10 in the Circular Polarization Mode in which the horizontal antenna 200 and the vertical antenna 100 are interlocked in an orthogonal relationship and mounted to a stand. As shown in FIGS. 12 and 13, One MCX cable from one of the two MCX output connectors of the CP Circuit is connected to the MCX input connector of the vertical antenna, and another MCX cable from the second MCX output connector is connected to the MCX input connector of the horizontal antenna. These two jumpers connect the horizontal antenna and the vertical antenna in the CP mode. The circular-polarized antenna system is connected to a single output of IEM (In-ear Monitor transmitter) or similar live entertainment transmitting system.

Figure 14:
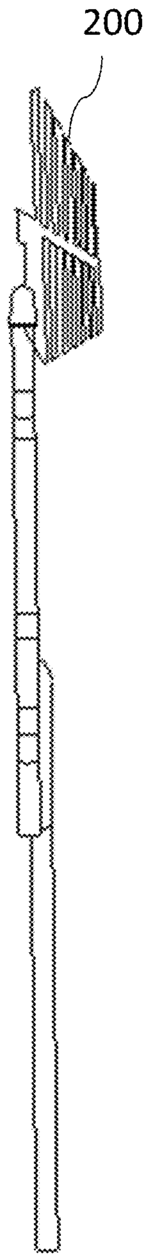
FIG. 14 shows the horizontal antenna system mounted to a microphone stand and used alone as an IEM transmit antenna, according to an exemplary embodiment of the system.

FIG. 14 shows the horizontal antenna 200 used independently of the vertical antenna. A single horizontal antenna component is used as an IEM transmit antenna when CP is not needed. Vertical antenna 100 and horizontal antenna 200 can both operate completely independently of each other when not used in diversity or CP modes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An antenna system comprising:
- a vertical antenna, the vertical antenna comprising:
  - a base;
  - antenna elements embedded in the base;
  - a plurality of spaced apart slots in the base along a middle longitudinal axis of the base;
  - a first connector configured to connect a cable from a receiver or transmitter; and
  - a first input connector configured for connecting a first jumper cable, wherein the first connector and the first input connector are connected in parallel to an antenna feed point of the vertical antenna through a feedline of the vertical antenna.

2. The antenna system of claim 1 wherein the antenna system further comprises:
- a horizontal antenna comprising:
  - a plurality of spaced apart plates, wherein an arrangement of the plurality of spaced apart plates corresponds to the plurality of spaced apart slots so that the horizontal antenna can be orthogonally mounted to the vertical antenna and the plurality of spaced apart plates can insert into the plurality of spaced apart slots;
  - a second connector configured to connect a cable from a receiver or transmitter; and
  - a second input connector configured for connecting a second jumper cable, wherein the second connector and the second input connector are connected in parallel to an antenna feed point of the horizontal antenna through a feedline of the horizontal antenna.

3. The antenna system of claim 2, wherein the antenna system further comprises:
- a circular-polarization adapter configured on the horizontal antenna or the vertical antenna, the circular-polarization adapter comprising a third connector, a first output connector, and a second output connector, wherein the first output connector is configured to connect the first jumper cable, and the second output connector is configured to connect the second jumper cable.

4. The antenna system of claim 3, wherein the first connector, the second connector, and the third connector are BNC connectors, wherein the first input connector, the second input connector, the first output connector, and the second output connector are MCX connectors, wherein the first jumper cable and the second jumper cable are MCX cables.

5. The antenna system of claim 4, wherein the horizontal antenna is orthogonally mounted to the vertical antenna, wherein the first jumper cable connects the first output connector to the first input connector, and wherein the second jumper cable connects the second output connector to the second input connector.

6. The antenna system of claim 5, wherein the circular-polarization adapter is configured on the vertical antenna.

7. A method for wirelessly receiving or transmitting signals, the method comprising:

mounting a vertical antenna on a stand, the vertical antenna comprises:

a base;

antenna elements embedded in the base;

a plurality of spaced apart slots in the base along a middle longitudinal axis of the base;

a first connector configured to connect a cable from a receiver or transmitter; and a first input connector configured for connecting a first jumper cable, wherein the first connector and the first input connector are connected in parallel to an antenna feed point of the vertical antenna through a feedline of the vertical antenna.

8. The method of claim 7, wherein the method further comprises:

mounting a horizontal antenna to the vertical antenna, wherein the horizontal antenna comprises:

a plurality of spaced apart plates, wherein an arrangement of the plurality of spaced apart plates corresponds to the plurality of spaced apart slots so that the horizontal antenna is orthogonally mounted to the vertical antenna and the plurality of spaced apart plates are inserted into the plurality of spaced apart slots;

a second connector configured to connect a cable from a receiver or transmitter; and a second input connector configured for connecting a second jumper cable, wherein the second connector and the second input connector are connected in parallel to an antenna feed point of the horizontal antenna through a feedline of the horizontal antenna.

9. The method of claim 8, wherein the horizontal antenna or the vertical antenna further comprises:

a circular-polarization adapter comprising a third connector, a first output connector, and a second output connector, wherein the first output connector is configured to connect the first jumper cable, and the second output connector is configured to connect the second jumper cable.

10. The method of claim 9, wherein the first connector, the second connector, and the third connector are BNC connectors, wherein the first input connector, the second input connector, the first output connector, and the second output connector are MCX connectors, wherein the first jumper cable and the second jumper cable are MCX cables.

11. The method of claim 10, wherein the method further comprises:

connecting the first output connector to the first input connector through the first jumper cable; and connecting the second output connector to the second input connector through the second jumper cable.

12. The method of claim 11, wherein the circular-polarization adapter is configured on the vertical antenna.

* * * * *